(12) United States Patent
Babineaux et al.

(10) Patent No.: US 11,137,109 B2
(45) Date of Patent: Oct. 5, 2021

(54) REMOTE GREASING SYSTEM

(71) Applicant: CACTUS WELLHEAD, LLC, Houston, TX (US)

(72) Inventors: Chad Babineaux, Lafayette, LA (US); Jason Cade, College Station, TX (US)

(73) Assignee: CACTUS WELLHEAD, LLC, Houston, TX (US)

( * ) Notice: Subject to any disclaimer, the term of this patent is extended or adjusted under 35 U.S.C. 154(b) by 0 days.

(21) Appl. No.: 16/852,255

(22) Filed: Apr. 17, 2020

(65) Prior Publication Data
US 2020/0332954 A1 Oct. 22, 2020

Related U.S. Application Data

(60) Provisional application No. 62/836,381, filed on Apr. 19, 2019.

(51) Int. Cl.
*E21B 41/00* (2006.01)
*F16N 11/08* (2006.01)
*E21B 34/02* (2006.01)

(52) U.S. Cl.
CPC ............. *F16N 11/08* (2013.01); *E21B 41/00* (2013.01); *E21B 34/02* (2013.01)

(58) Field of Classification Search
CPC .......... E21B 34/02; E21B 41/00; F16N 11/08; F16N 2280/00
See application file for complete search history.

(56) References Cited

U.S. PATENT DOCUMENTS

| | | | |
|---|---|---|---|
| 6,981,377 B2* | 1/2006 | Vaynberg | F01K 25/08 60/641.11 |
| 10,100,978 B2* | 10/2018 | Gouge | F16N 13/22 |
| 10,260,327 B2 | 4/2019 | Kajaria et al. | |
| 10,612,678 B1* | 4/2020 | Golden | E21B 43/2607 |
| 10,753,535 B2 | 8/2020 | McKim et al. | |
| 10,760,735 B2 | 9/2020 | McKim et al. | |
| 10,982,808 B2* | 4/2021 | Zerkus | F16K 3/0254 |
| 2005/0218841 A1* | 10/2005 | Marks | G05B 19/042 318/66 |
| 2011/0094731 A1* | 4/2011 | Crawford | E21B 33/08 166/84.2 |

(Continued)

FOREIGN PATENT DOCUMENTS

WO 90/03490 A1 4/1990

*Primary Examiner* — Daniel P Stephenson
(74) *Attorney, Agent, or Firm* — Locklar PLLC

(57) ABSTRACT

A remote greasing system for lubricating a valve of a wellhead or frac manifold includes a grease supply skid, remote greasing skid, and a control skid. The grease supply skid includes a grease reservoir and a grease pump. The remote greasing skid includes a grease manifold and a grease supply valve. The grease manifold is operatively coupled to the grease pump of the grease supply skid by a grease trunk line. The grease supply valve is operatively coupled to the grease manifold. The grease supply valve includes an output port operatively coupled to a lubrication port of the valve of the wellhead or frac manifold by a grease supply line. The control skid is operatively coupled to the remote greasing skid by a control line. The grease supply skid and remote greasing skid are positioned within a hazardous zone, and the control skid is positioned outside of the hazardous zone.

14 Claims, 12 Drawing Sheets

(56) References Cited

U.S. PATENT DOCUMENTS

| | | | |
|---|---|---|---|
| 2012/0247876 A1* | 10/2012 | Kreutzkamper | F16N 29/02 184/26 |
| 2014/0048255 A1* | 2/2014 | Baca | E21B 34/02 166/250.1 |
| 2015/0176762 A1* | 6/2015 | Conley | F16N 13/06 417/43 |
| 2015/0345272 A1* | 12/2015 | Kajaria | E21B 47/00 166/250.01 |
| 2017/0114957 A1* | 4/2017 | Conley | F16N 7/385 |
| 2017/0146189 A1* | 5/2017 | Herman | F16N 21/00 |
| 2017/0276293 A1* | 9/2017 | McKim | E21B 34/02 |
| 2020/0284122 A1* | 9/2020 | Golden | E21B 43/2607 |
| 2020/0332954 A1* | 10/2020 | Babineaux | E21B 41/00 |
| 2020/0347990 A1* | 11/2020 | McKim | F16N 29/02 |
| 2020/0355321 A1* | 11/2020 | Zerkus | F16N 7/385 |

\* cited by examiner

REMOTE GREASING SYSTEM

CROSS-REFERENCE TO RELATED APPLICATIONS

This application is a non-provisional application which claims priority from U.S. provisional application No. 62/836,381, filed Apr. 19, 2019, the entirety of which is hereby incorporated by reference.

TECHNICAL FIELD

Field of the Disclosure

The present disclosure relates generally to oilfield equipment and specifically to lubrication systems for wellhead equipment.

Background of the Disclosure

During well completions or during workover, an assembly of valves, commonly referred to as a frac tree, is coupled to the wellhead. The valves of the frac tree are used to allow fluid conduits passing into and out of the well to be selectively opened or closed. Additional valves may be positioned on manifolds to transmit frac fluid to the frac tree. During certain operations, such as hydraulic fracturing, the frac tree may contain large pressures within the well. Regular lubrication of the valves of the frac tree and manifold may, for example and without limitation, help to ensure reliable operation of the valves and reduce the incidence of valve sticking or otherwise failing to operate as desired. However, due to the hazards involved with wellbore operations including, for example, high pressures and potentially flammable atmospheres, the area around the frac tree may be too dangerous for wellsite personnel to remain in the vicinity to operate lubrication equipment on the wellhead that is in use or any other frac trees positioned in the vicinity. Due to the safety considerations, lubrication typically requires all well operations be halted to allow valve lubrication to be accomplished.

SUMMARY

The present disclosure provides for a remote greasing system for lubricating a valve of a wellhead or frac manifold. The remote greasing system may include a grease supply skid. The grease supply skid may include a grease reservoir and a grease pump. The remote greasing system may include a remote greasing skid. The remote greasing skid may include a grease manifold. The grease manifold may be coupled to the grease pump of the grease supply skid by a grease trunk line. The remote greasing skid may include a grease supply valve operatively coupled to the grease manifold. The grease supply valve may have an output port operatively coupled to a lubrication port of the valve of the wellhead or frac manifold by a grease supply line. The remote greasing system may include a control skid. The control skid may include an interface. The control skid may be operatively coupled to the remote greasing skid by a control line. The control skid may be adapted to control the actuation of the grease supply valve. The grease supply skid and remote greasing skid may be positioned within a threshold distance of the wellhead defining a hazardous zone. The control skid may be positioned outside of the hazardous zone.

The present disclosure also provides for a method. The method may include providing a grease supply skid. The grease supply skid may include a grease reservoir and a grease pump. The method may include positioning the grease supply skid within a threshold distance of a wellhead or a frac manifold defining a hazardous zone. The method may include providing a remote greasing skid. The remote greasing skid may include a grease manifold and a grease supply valve. The grease supply valve may be operatively coupled to the grease manifold. The grease supply valve may have an output port. The method may include positioning the remote greasing skid within the hazardous zone, operatively coupling the grease manifold to the grease pump of the grease supply skid by a grease trunk line, and coupling the output port of the grease supply valve to a lubrication port of a valve of the wellhead or the frac manifold by a grease supply line. The method may include providing a control skid. The control skid may include an interface. The method may include positioning the control skid outside of the hazardous zone, and operatively coupling the control skid to the remote greasing skid by a control line. The control skid may be adapted to control the actuation of the grease supply valve. The method may include providing grease to the remote greasing skid with the grease supply skid, actuating the grease supply valve with the control skid, and providing grease to the valve of the wellhead or the frac manifold.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
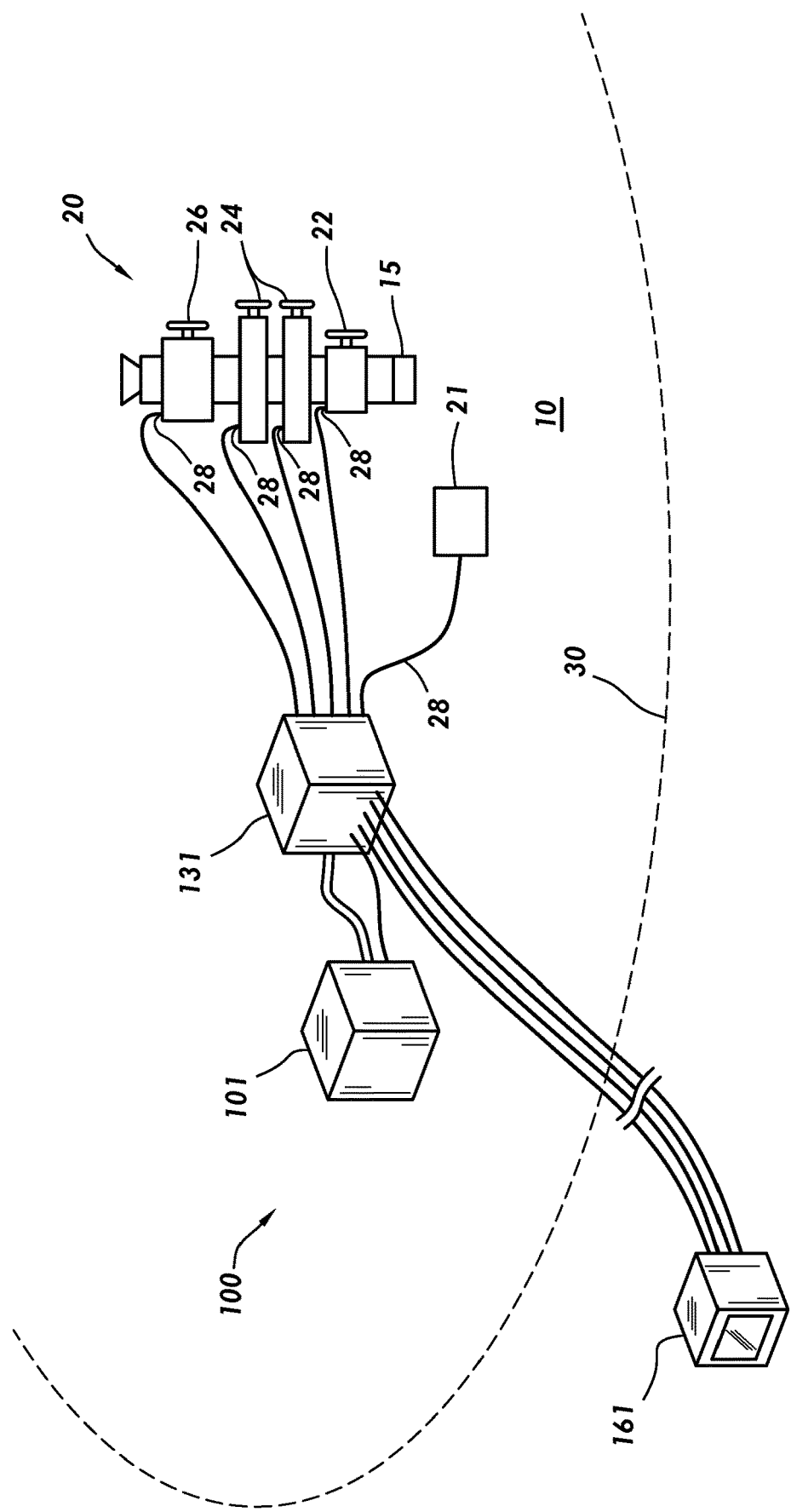
FIG. 1 depicts an overview of a wellsite including a remote greasing system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1A:
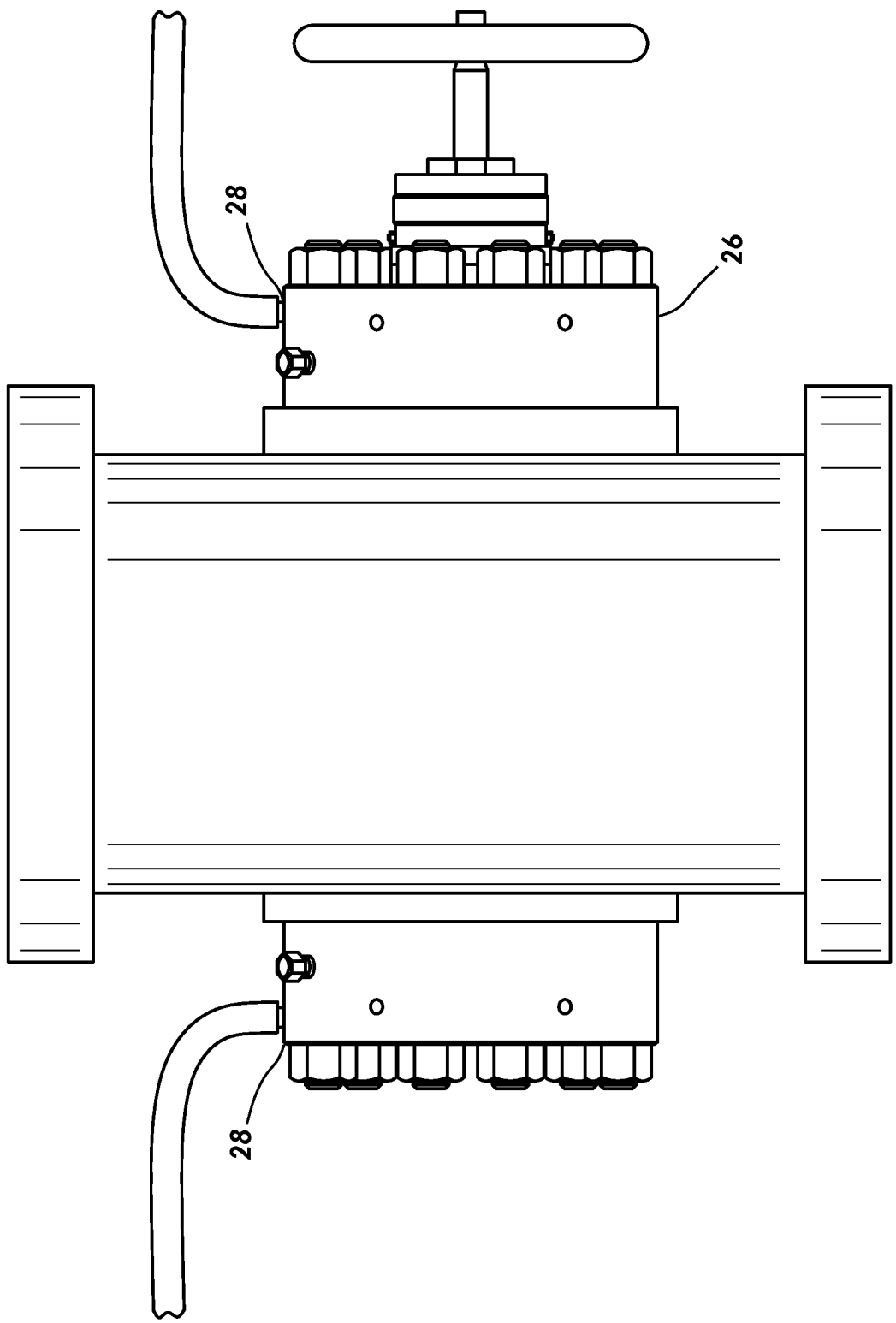
FIG. 1A depicts a detail view of a valve of a frac tree of the wellsite depicted in FIG. 1.

FIG. 1 depicts wellsite 10. Wellsite 10 may include one or more wells, depicted as wellheads 15. One or more of wellheads 15 may include a valve assembly coupled to wellhead 15, depicted as and referred to herein as frac trees 20. In some embodiments, wellsite 10 may also include one or more frac manifolds 21, which may be used to supply fluid to frac trees 20 during hydraulic fracturing operations. Each frac tree 20 may include one or more valves including, for example and without limitation, master valves 22, wing valves 24, and swab (or crown) valve 26. In some embodiments, each valve of frac tree 20 may include one or more greasing ports 28, as shown in FIG. 1A, positioned to allow a lubricant such as grease to be introduced into the respective valve to lubricate and provide sealing for the internal components of the valve as further discussed below.

Remote greasing system 100 may be positioned at wellsite 10. In some embodiments, remote greasing system 100 may include grease supply skid 101, remote greasing skid 131, and control skid 161. In some embodiments, grease supply skid 101 and remote greasing skid 131 may be positioned near frac tree 20. In some embodiments, control skid 161 may be positioned a distance away from grease supply skid 101 and remote greasing skid 131 to, for example and without limitation, allow an operator of control skid 161 to remain a safe distance away from frac tree 20 while a wellbore operation is underway, allowing the operator to operate remote greasing system 100 and lubricate a valve of frac tree 20 during such a wellbore operation. For example and without limitation, in some embodiments, control skid 161 may be positioned outside of the defined hazardous zone 30. Hazardous zone 30 may be defined as a threshold distance about frac tree 20. The threshold distance of hazardous zone 30 may be defined based on anticipated conditions around frac tree 20 including, for example and without limitation, the presence of a hazardous atmosphere (such as one that may include explosive gas or low oxygen) or the presence of high pressures. In some cases, for example and without limitation, hazardous zone 30 may be between 50 and 70 feet around frac tree 20.

Figure 2:
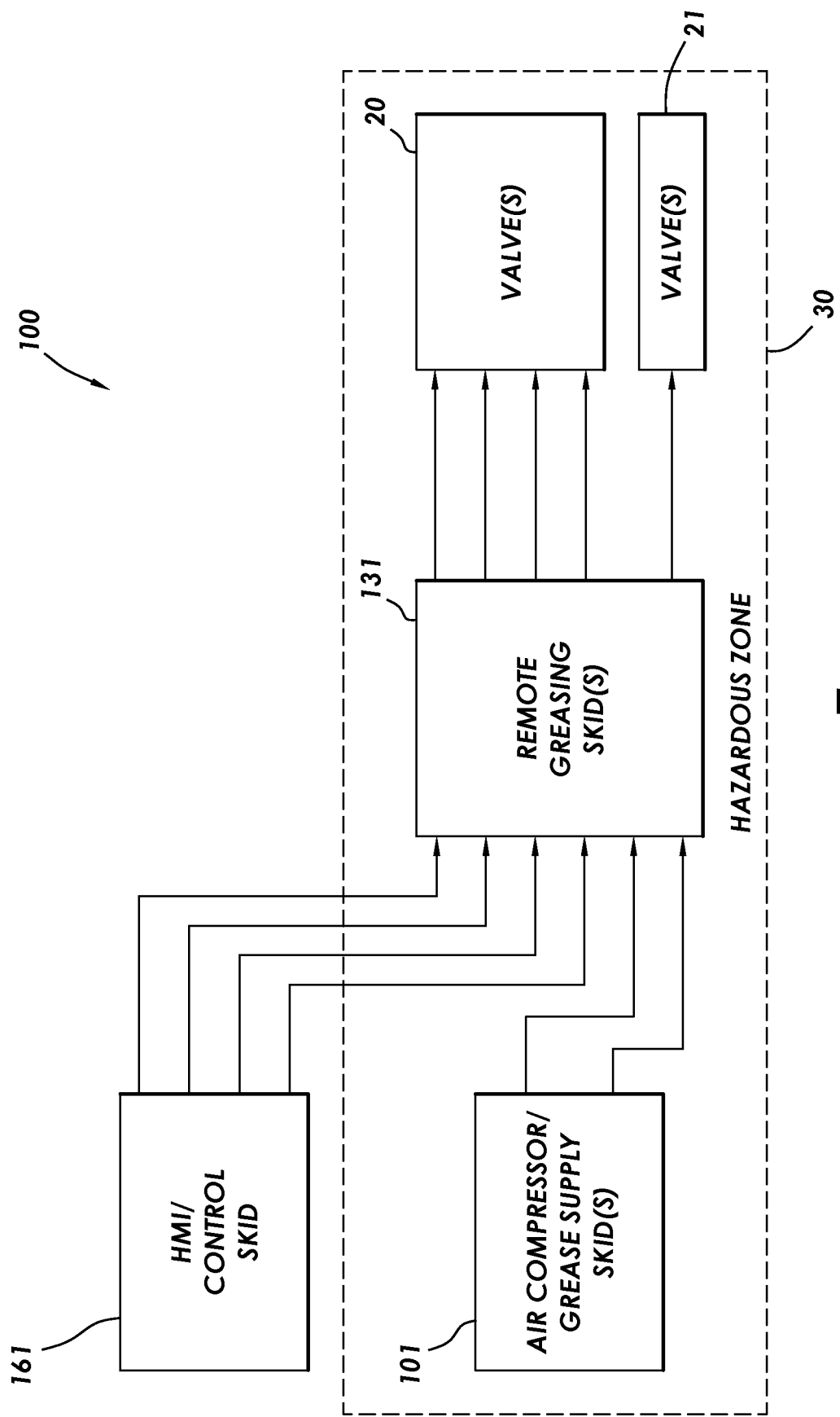
FIG. 2 depicts a schematic diagram of a remote greasing system consistent with at least one embodiment of the present disclosure.
Figure 3:
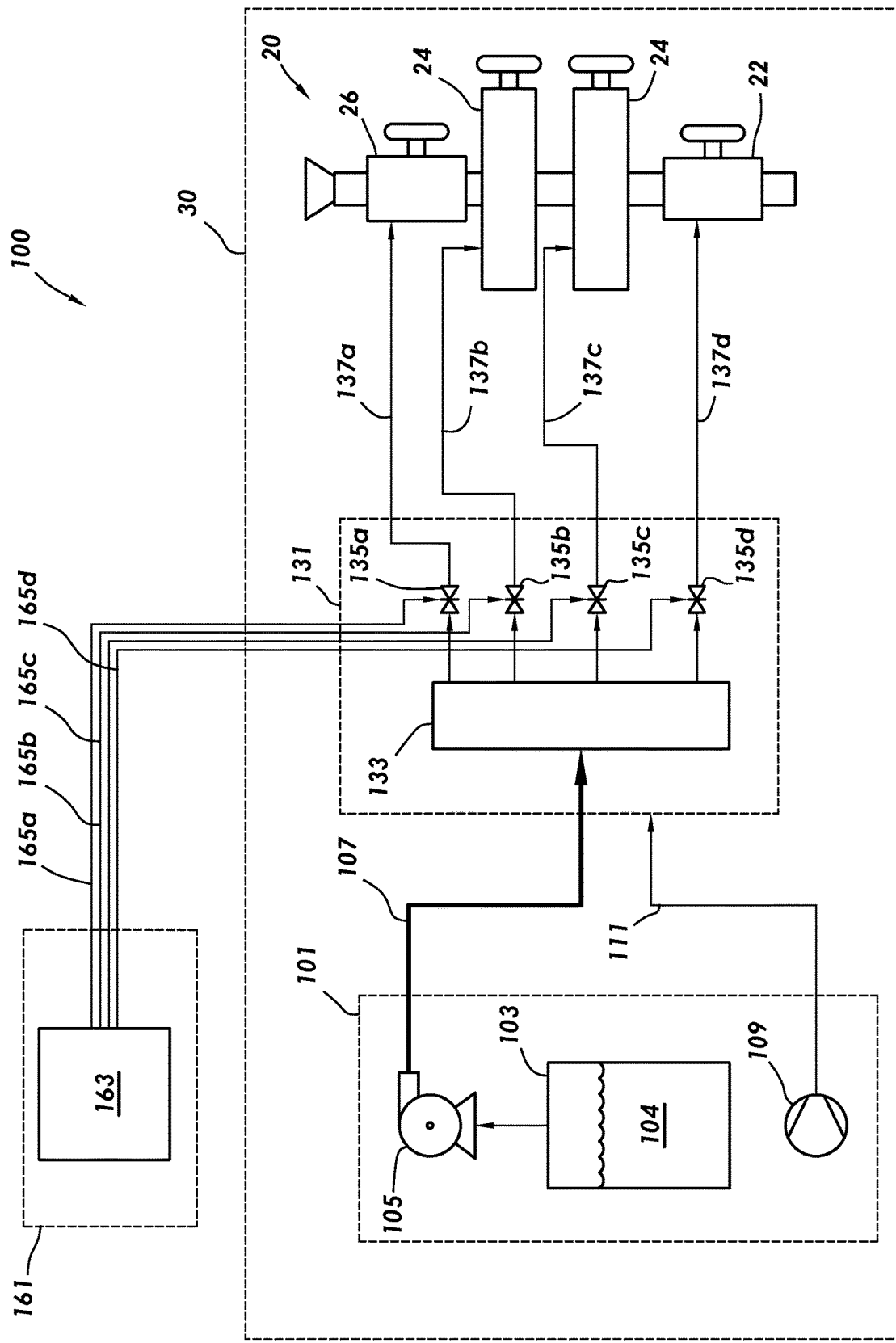
FIG. 3 depicts a process flow diagram of a remote greasing system consistent with at least one embodiment of the present disclosure.

In some embodiments, as depicted in FIGS. 2 and 3, grease supply skid 101, remote greasing skid 131, and control skid 161 may be operatively coupled to allow lubrication of valves of frac tree 20 and frac manifold 21. Although a single grease supply skid 101 and a single remote greasing skid 131 are depicted, any number of grease supply skids 101 and remote greasing skids 131 may be used and controlled by a single control skid 161 without deviating from the scope of the present disclosure.

In some embodiments, grease supply skid 101 may include grease reservoir 103. Grease reservoir 103 may be, for example and without limitation, a drum containing grease 104. Grease supply skid 101 may include one or more grease pumps 105 positioned to pump grease 104 from grease reservoir 103. In some embodiments, grease pumps 105 may be, for example and without limitation, a positive displacement pump such as a piston pump, screw pump, or progressing cavity pump. Grease pumps 105 may output grease into grease trunk line 107 for supply to remote greasing skid 131 as further discussed below. In some embodiments, grease supply skid 101 may be positioned near to remote greasing skid 131 within wellsite 10 such that the length of grease trunk line 107 may be minimized. By reducing the length of grease trunk line 107, without being bound to theory, the pressure drop along grease trunk line 107 may be reduced from the amount of pressure drop associated with a grease trunk line that extends outside of hazardous zone 30. Additionally, by using a single, larger grease trunk line 107, the total pressure drop may be reduced as compared to a system that includes multiple smaller grease lines.

In some embodiments, grease supply skid 101 may include compressor 109, which may be used to supply an actuation medium for actuating one or more components of remote greasing skid 131 as further described below. For example, in some embodiments, compressor 109 may be an air compressor positioned to supply air to pneumatic supply line 111. In other embodiments, compressor 109 may be a hydraulic pump for supplying hydraulic fluid to remote greasing skid 131. In some embodiments, compressor 109 may be positioned on a separate skid.

In some embodiments, remote greasing skid 131 may include grease manifold 133. Grease manifold 133 may receive grease from grease trunk line 107. Grease manifold 133 may be operatively coupled to grease supply valves 135a-d. In some embodiments, for example and without limitation, grease supply valves 135a-d may be pneumatically or hydraulically actuated needle valves. In some embodiments, grease supply valves 135a-d may be electrically actuated. Each of the grease supply valves 135a-d may be operatively coupled to a greasing port of a valve of frac tree 20 (or frac manifold 21 as discussed above), shown in FIG. 3 as master valve 22, wing valves 24, and swab valve 26, via a respective grease supply line 137a-d. In some embodiments, when one or more of grease supply valves 135a-d are opened, high-pressure grease from grease manifold 133 may be allowed to flow through the respective grease supply line 137a-d and into the corresponding valve of frac tree 20, thereby lubricating the respective valve.

In some embodiments, each grease supply valve 135a-d may be controlled by control skid 161. Control skid 161 may include interface 163 to allow an operator to control the operation of grease supply valves 135a-d. In some embodiments, interface 163 may include one or more manual controls including, for example and without limitation, buttons, dials, or other components. In other embodiments, interface 163 may include one or more digital controls including, for example and without limitation, a touchscreen interface as discussed further herein below. In some embodiments, control skid 161 may electrically, pneumatically, or hydraulically control the actuation of grease supply valves 135a-d via one or more corresponding control lines 165a-d. In some embodiments, for example and without limitation, control skid 161 may electrically control grease supply valves 135a-d, which may be pneumatically actuated. In some embodiments, control skid 161 may control the operation of grease pump 105 and compressor 109.

Although four grease supply valves 135a-d are depicted in FIG. 3, remote greasing skid 131 may include any number of grease supply valves within the scope of the present disclosure.

Figure 4:
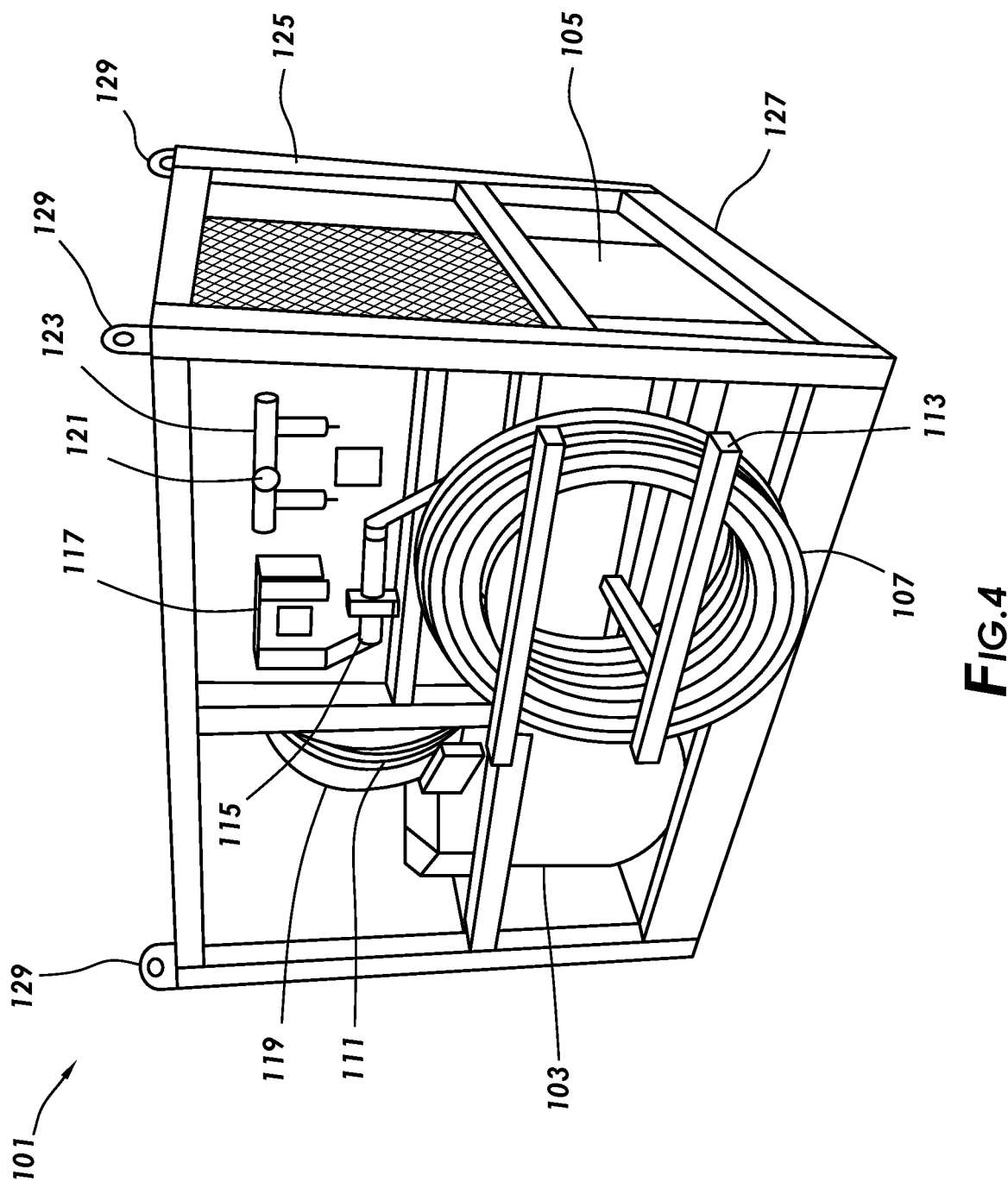
FIG. 4 depicts a perspective view of a grease supply skid consistent with at least one embodiment of the present disclosure.

FIG. 4 depicts a perspective view of grease supply skid 101 consistent with at least one embodiment of the present disclosure. As discussed above, grease supply skid 101 may include grease reservoir 103. In some embodiments, grease supply skid 101 may include trunk line spool 113 positioned to, for example and without limitation, allow grease trunk line 107 to be stored on grease supply skid 101 when grease trunk line 107 is not in use, such as, for example and without limitation, during transportation of grease supply skid 101. In some embodiments, grease trunk line 107 may be fluidly coupled to remain coupled to grease pump 105 through one or more valves 115 or regulators 117.

In some embodiments, grease supply skid 101 may include pneumatic supply line spool 119 positioned to, for example and without limitation, allow pneumatic supply line 111 to be stored on grease supply skid 101 when pneumatic supply line 111 is not in use, such as, for example and without limitation, during transportation of grease supply skid 101. In some embodiments, grease supply skid 101 may include one or more pneumatic valves 121 or pneumatic regulators 123 positioned to, for example and without limitation, allow the pressure of air within pneumatic supply line 111 to be regulated. In some embodiments, one or more pneumatic filters may be included in grease supply skid 101 and/or in pneumatic supply line 111.

In some embodiments, grease supply skid 101 may include supply skid frame 125. Supply skid frame 125 may support the components of grease supply skid 101. In some embodiments, supply skid frame 125 may include one or more features for transportation of grease supply skid 101 including, for example and without limitation, forklift points 127 and hoisting points 129.

Figure 5:
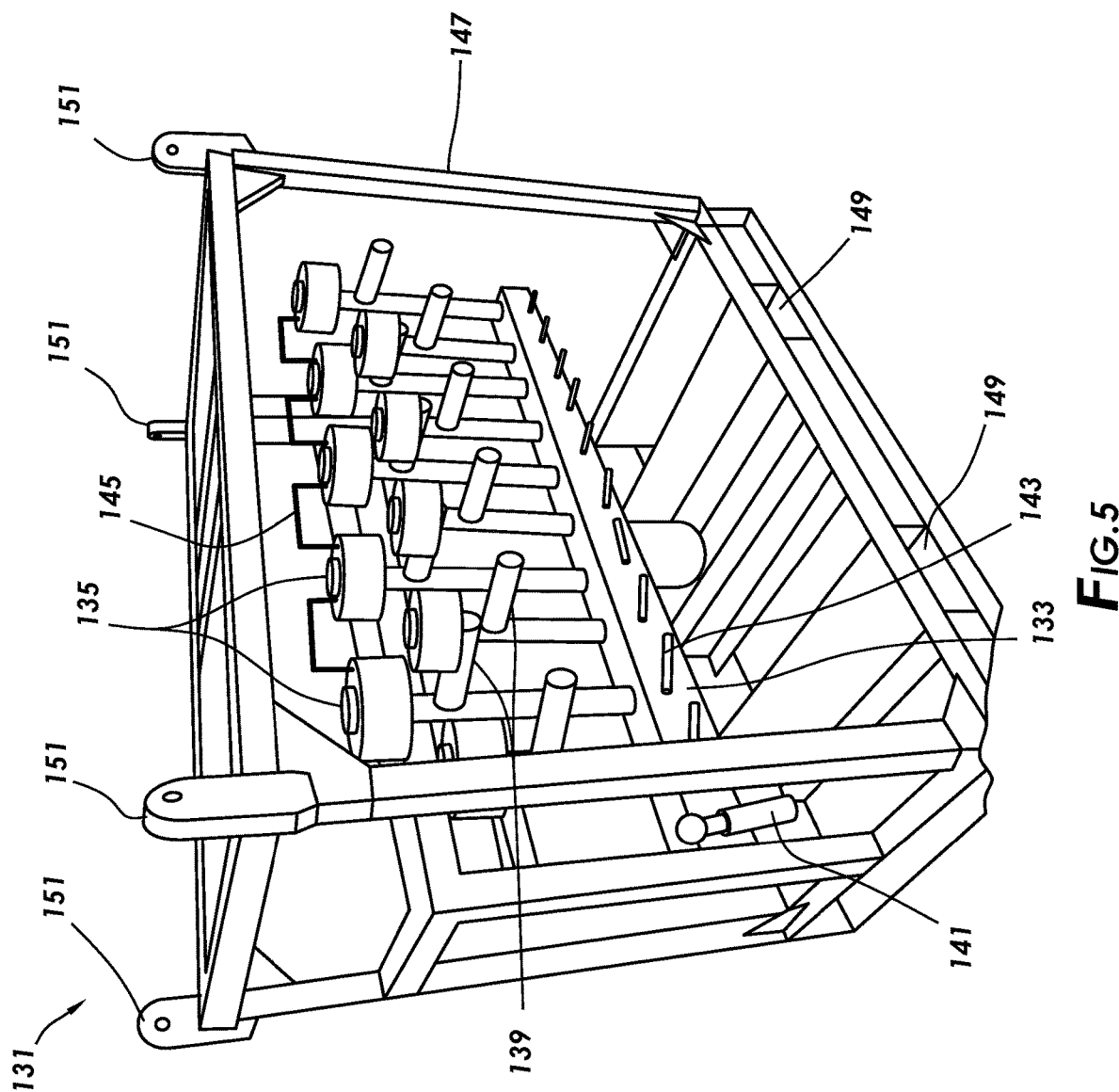
FIG. 5 depicts a perspective view of a remote greasing skid consistent with at least one embodiment of the present disclosure.

FIG. 5 depicts a perspective view of remote greasing skid 131 consistent with at least one embodiment of the present disclosure. As discussed above, remote greasing skid 131 may include grease manifold 133, which is operatively coupled to grease supply valves 135. Each grease supply valve 135 may include an output port 139, to which a respective grease supply line may be coupled. Grease manifold 133 may couple to grease trunk line 107 through connector 141. In some embodiments, grease manifold 133 may couple to each grease supply valve 135 through a corresponding throttling valve 143, positioned to allow the volume supplied to each corresponding grease supply valve 135 to be regulated. In some embodiments in which grease supply valves 135 are pneumatically actuated, each grease supply valve 135 may be coupled to pneumatic valve actuation line 145, which may be coupled to pneumatic supply line 111 through one or more control valves. The control valves may be actuated by control skid 161 or may be positioned on control skid 161.

In some embodiments, remote greasing skid 131 may include greasing skid frame 147. Greasing skid frame 147 may support the components of remote greasing skid 131. In some embodiments, greasing skid frame 147 may include one or more features for transportation of remote greasing skid 131 including, for example and without limitation, forklift points 149 and hoisting points 151.

Figure 6:
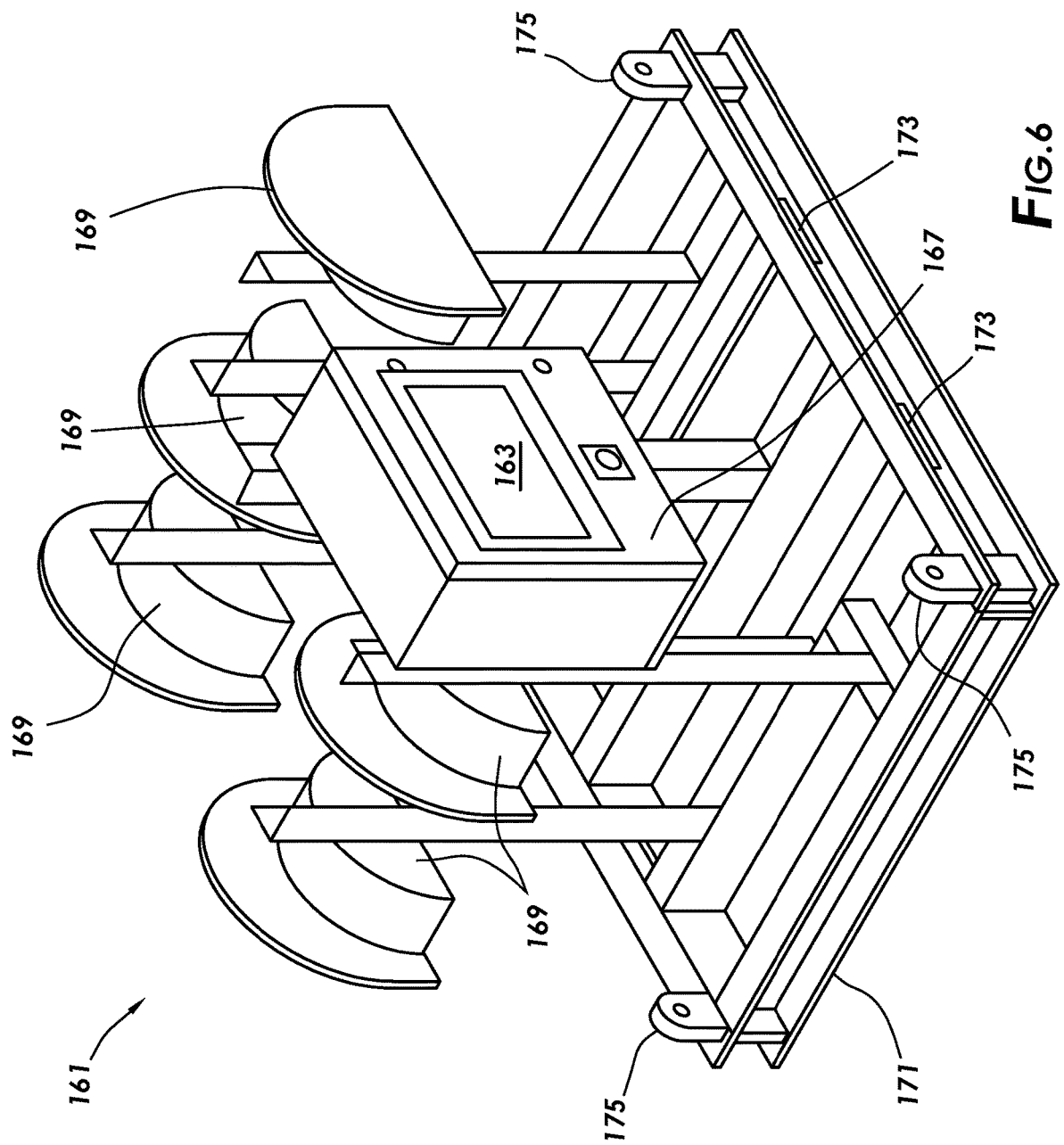
FIG. 6 depicts a control skid consistent with at least one embodiment of the present disclosure.

FIG. 6 depicts control skid 161 consistent with at least one embodiment of the present disclosure. As discussed above, control skid 161 may include interface 163 to allow an operator to control the operation of remote greasing skid 131 and grease supply skid 101. In some embodiments, control skid 161 may include enclosure 167 positioned to enclose components of interface 163. In some embodiments, control skid 161 may include one or more hose reels 169 positioned to allow storage of control lines on control skid 161 when the control lines are not in use such as during transportation of control skid 161.

In some embodiments, control skid 161 may include control skid frame 171. Control skid frame 171 may support the components of control skid 161. In some embodiments, control skid frame 171 may include one or more features for transportation of control skid 161 including, for example and without limitation, forklift points 173 and hoisting points 175.

Figure 7A:
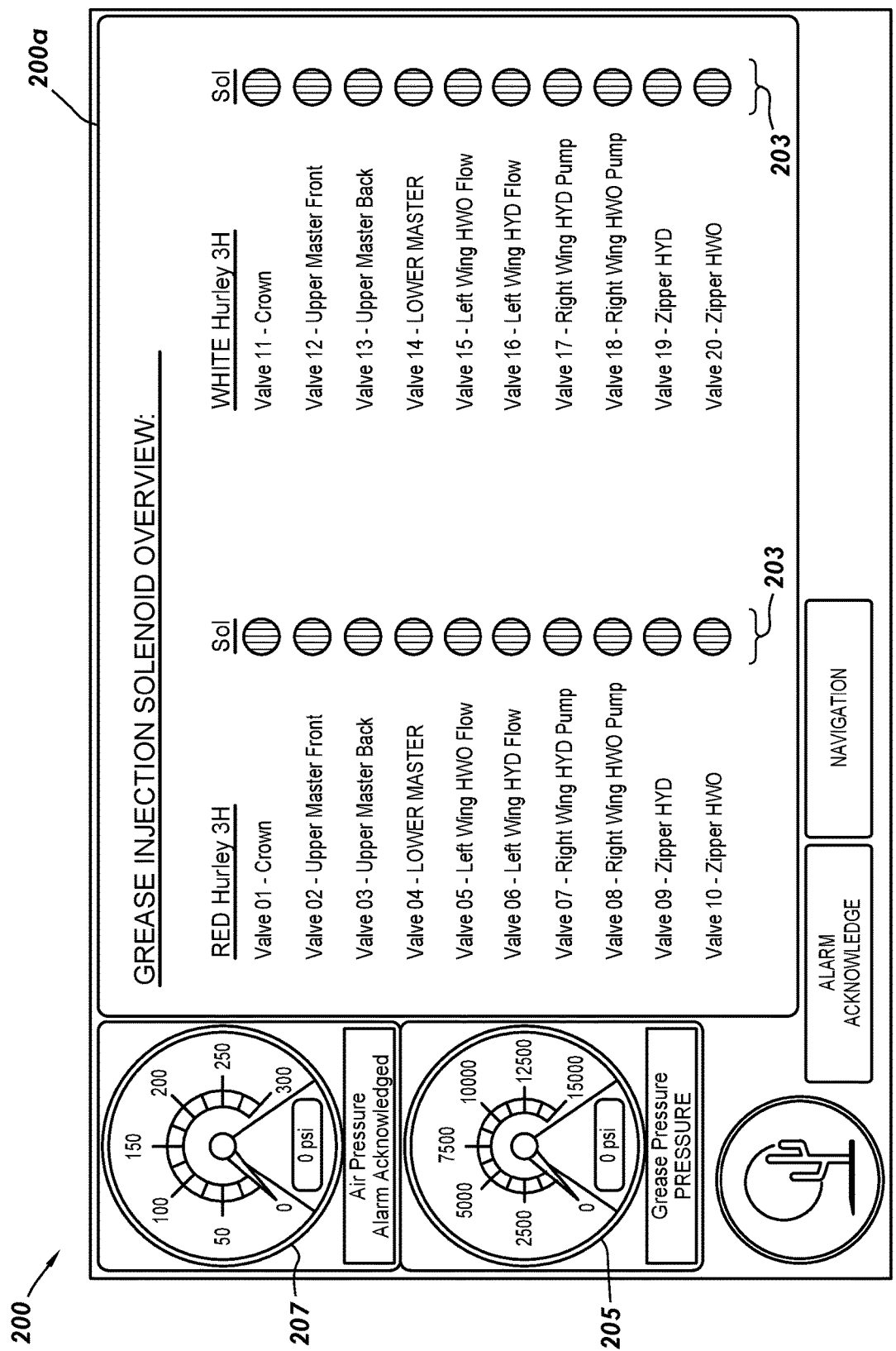
FIGS. 7A-7E depict aspects of a graphical user interface for a control skid consistent with at least one embodiment of the present disclosure.

FIGS. 7A-7E depict various aspects of an example of a graphical user interface (GUI) 200 for a digital, touchscreen-based embodiment of interface 163. GUI 200 may include one or more controls adapted to allow an operator to control the operation of remote greasing system 100. In some embodiments, GUI 200 may provide one or more screens for user interaction with remote greasing system 100. For example and without limitation, in some embodiments, GUI 200 may include status overview display 200a as shown in FIG. 7A, wherein visual indicators 203 display the status of each grease supply valve 135 of remote greasing skid 131. In some embodiments, GUI 200 may be used to control grease supply valves 135 that supply multiple frac trees 20. In some embodiments, elements of GUI 200 as discussed herein may be color-coded to allow for association with particular frac trees 20 or otherwise assist with visual identification thereof.

Figure 7B:
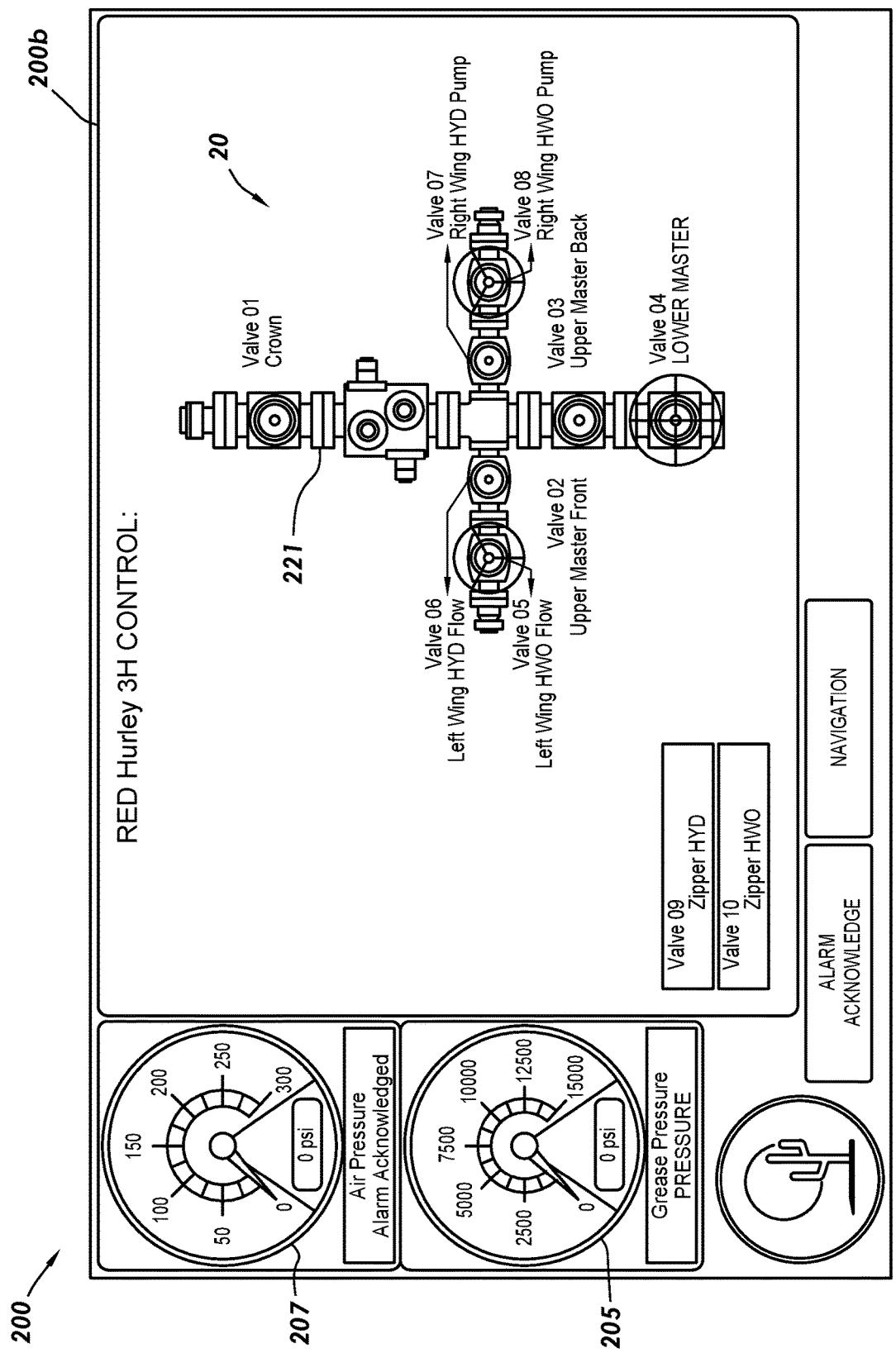
Figure 7C:
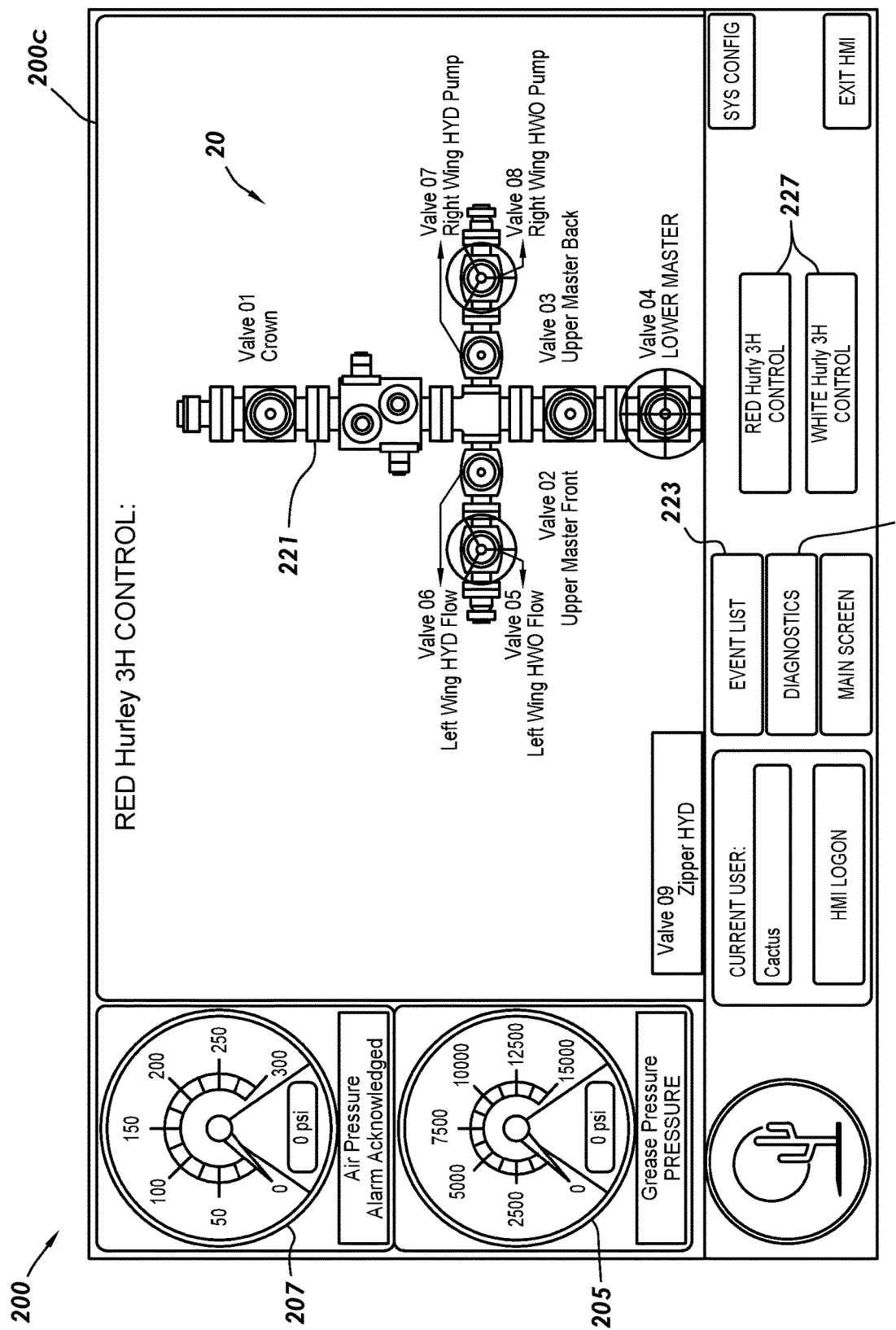

In some embodiments, GUI 200 may include visual status display 200b as shown in FIG. 7B. In such an embodiment, each grease supply valve 135 of remote greasing skid 131 may be mapped to the valve of frac tree 20 to which the corresponding grease supply valve 135 is supplying. In such an embodiment, visual control display 200b may display graphical representation 221 of frac tree 20 such that control of each grease supply valve 135 may be more directly or conveniently associated with the corresponding valve of frac tree 20, and may provide indication of the status of each grease supply valve 135 as applied to the corresponding valve of frac tree 20. In some embodiments, GUI 200 may include visual control display 200c, as shown in FIG. 7C, wherein a user may be able to access additional information through one or more user interaction elements to access, for example and without limitation, event list 223, diagnostic tools 225, or to access manual control display 200d for frac tree 20 as shown by buttons 227.

Figure 7D:
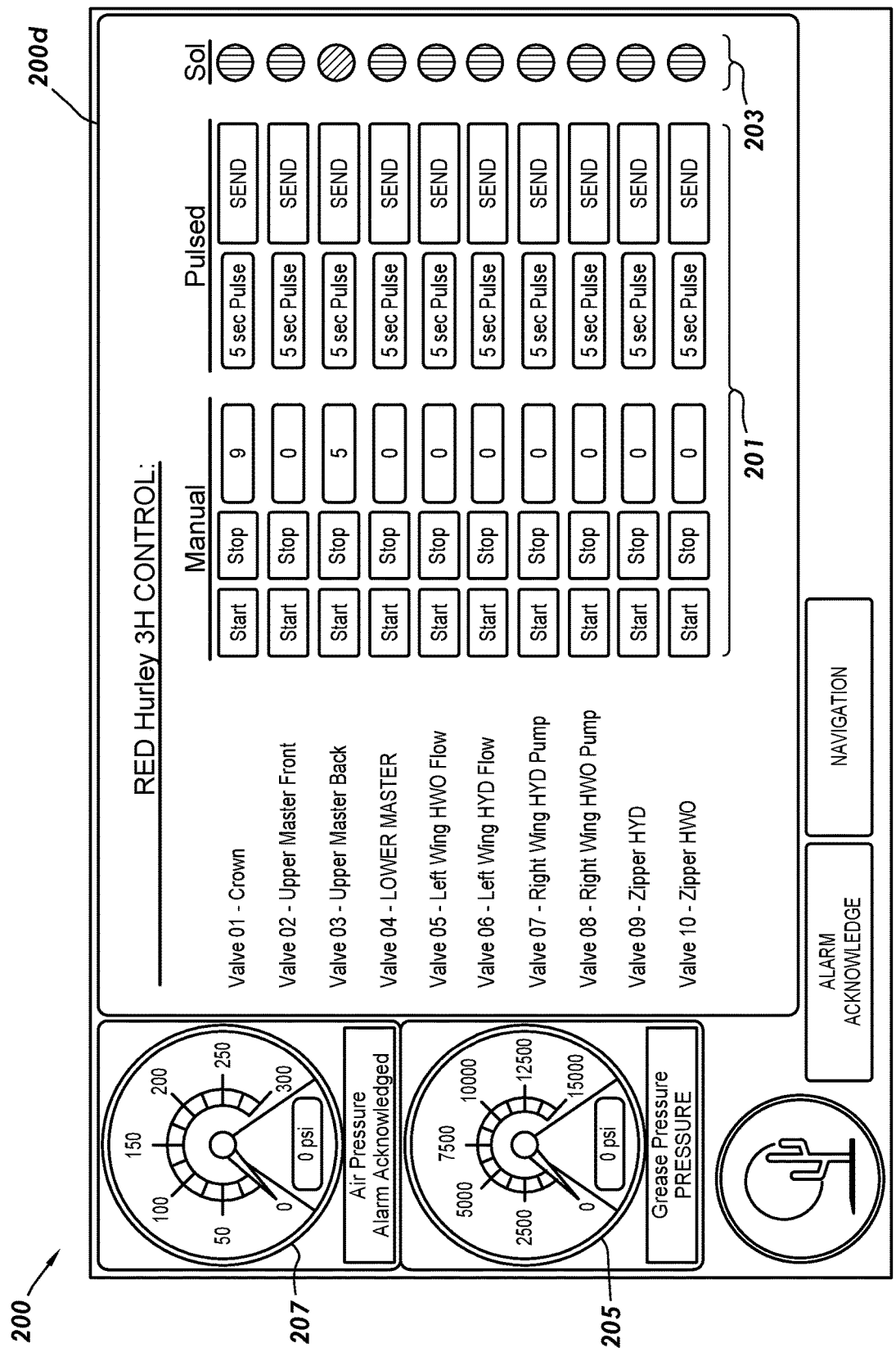

In some embodiments, GUI 200 may include manual control display 200d as shown in FIG. 7D. In such an embodiment, each grease supply valve 135 of remote greasing skid 131 may be manually operated by, for example and without limitation, the use of user interaction elements 201, which may be, for example and without limitation, buttons. In some such embodiments, for example and without limitation, user interaction elements 201 may include start commands, stop commands, and pulse commands for operation of each grease supply valve 135. In some embodiments, GUI 200 may include visual indicators 203 for displaying the status of each grease supply valve 135 of remote greasing skid 131.

Figure 7E:
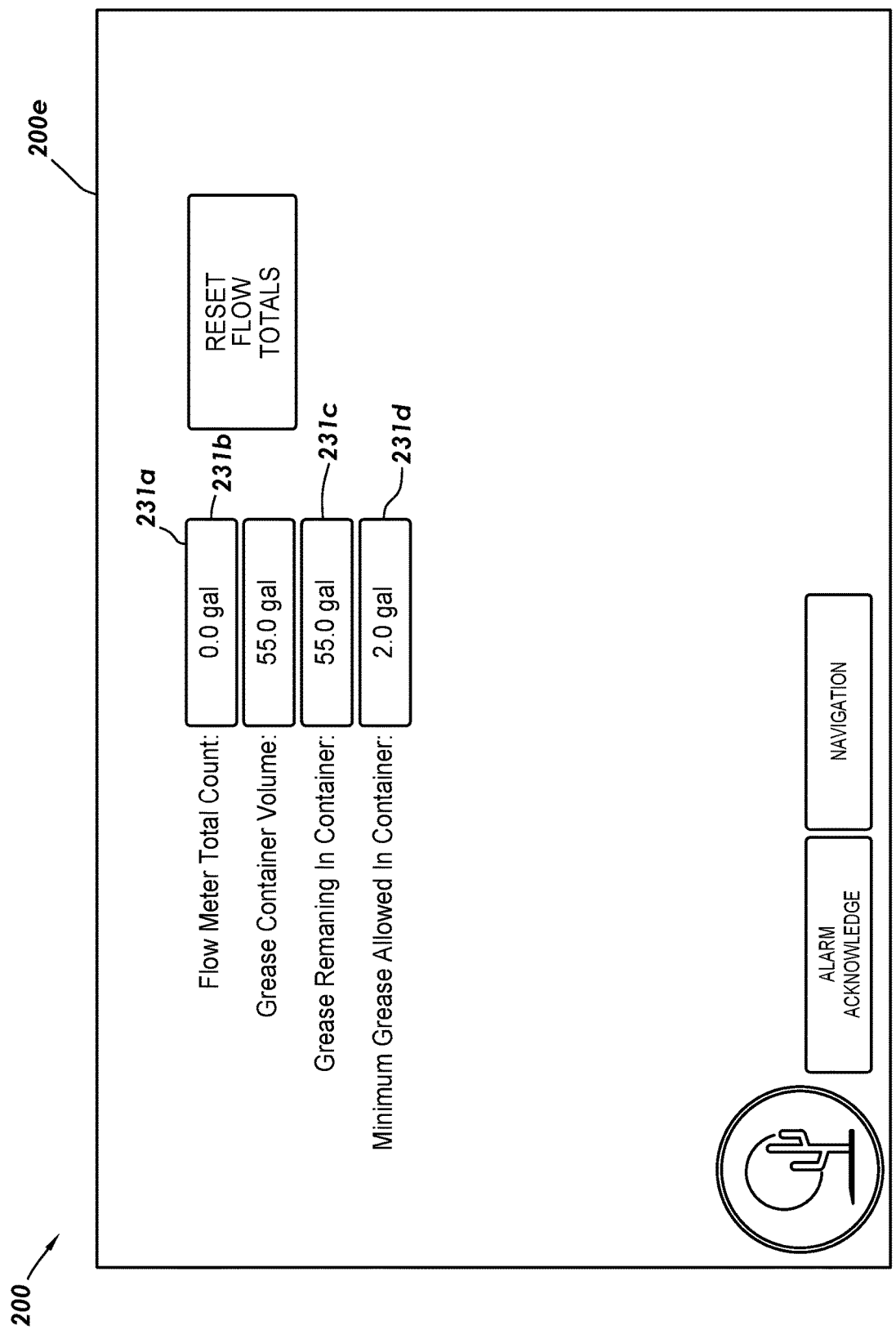

In some embodiments, for example and without limitation, GUI 200 may include flow history screen 200e as shown in FIG. 7E. In such an embodiment, flow history screen 200e may display or allow a user to enter, for example and without limitation, the amount of grease supplied (231a), the volume of the grease container (231b), the amount of grease remaining in the container (231c), and a minimum allowable value for grease remaining in the container (231d).

In some embodiments, as shown in FIGS. 7A-D, GUI 200 may further display information relating to the operation of remote greasing system 100 including, for example and without limitation, grease pressure 205 and air pressure 207. In some embodiments, GUI 200 may include one or more program buttons to allow a user to execute a prespecified or customized series of valve openings and closings. In some embodiments, GUI 200 may include a lockout feature in which the opening of a valve is disallowed during certain operating conditions or after certain procedures are undertaken.

In some embodiments, interface 163 may provide one or more visual indicators of issues arising from the operation of remote greasing system 100. For example and without limitation, in some embodiments, interface 163 may provide one or more visual or audible alarms based on certain operating conditions encountered including, for example and without limitation, an unacceptable reduction or increase in air pressure or grease pressure or a condition in which the grease container is below the minimum allowable value for grease remaining in the container is reached.

With reference to FIGS. 1-3, in order to operate remote greasing system 100 at wellsite 10, grease supply skid 101, remote greasing skid 131, and control skid 161 may be transported to wellsite 10. Grease supply skid 101 and remote greasing skid 131 may be positioned relatively close to wellhead 15 with which remote greasing system 100 will be utilized, while control skid 161 may be positioned a distance away from wellhead 15 outside of hazardous zone 30. Grease trunk line 107 and pneumatic supply line 111 may be operatively coupled to remote greasing skid 131 from grease supply skid 101. Grease supply lines 137*a-d* may be operatively coupled between grease supply valves 135*a-d* and greasing ports 28 of valves of frac tree 20. Control lines 165*a-d* may be operatively coupled between control skid 161 and remote greasing skid 131. Grease pump 105 and compressor 109 may be activated to supply grease and pressurized air to remote greasing skid. As desired, one or more of grease supply valves 135*a-d* may be opened to supply grease to the valves of frac tree 20 using interface 163 of control skid 161.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A remote greasing system for lubricating a valve of a wellhead or frac manifold comprising:
   a grease supply skid, the grease supply skid including a grease reservoir and a grease pump;
   a remote greasing skid, the remote greasing skid including:
      a grease manifold, the grease manifold operatively coupled to the grease pump of the grease supply skid by a grease trunk line; and
      a grease supply valve, the grease supply valve operatively coupled to the grease manifold, the grease supply valve having an output port, the output port operatively coupled to a lubrication port of the valve of the wellhead or frac manifold by a grease supply line; and
   a control skid, the control skid including an interface, the control skid operatively coupled to the remote greasing skid by a control line, the control skid adapted to control the actuation of the grease supply valve;
   wherein the grease supply skid and remote greasing skid are positioned within a threshold distance of the wellhead defining a hazardous zone, and wherein the control skid is positioned outside of the hazardous zone.

2. The remote greasing system of claim 1, wherein the grease supply valve is a needle valve.

3. The remote greasing system of claim 1, wherein the grease supply skid further comprises a compressor, and wherein the grease supply valve is a pneumatically actuated valve controlled using pneumatic pressure supplied by the compressor through a pneumatic supply line.

4. The remote greasing system of claim 1, wherein the grease supply skid further comprises a hydraulic pump, and wherein the grease supply valve is a hydraulically actuated valve controlled using hydraulic pressure supplied by the hydraulic pump.

5. The remote greasing system of claim 1, wherein the interface comprises one or more manual controls including buttons or dials.

6. The remote greasing system of claim 1, wherein the interface comprises a touchscreen interface having a graphical user interface displayed thereon, the graphical user interface including one or more buttons positioned to allow control of the grease supply valve.

7. The remote greasing system of claim 6, wherein the graphical user interface further comprises a display of grease pressure or air pressure.

8. The remote greasing system of claim 6, wherein the graphical user interface further comprises a visual indicator of the status of the supply valve.

9. The remote greasing system of claim 6, wherein the graphical user interface further comprises a graphical representation of a frac tree, the frac tree having a valve supplied with grease by the grease supply valve, the graphical representation of the frac tree indicating the status of the grease supply valve.

10. The remote greasing system of claim 6, wherein the graphical user interface includes a flow history screen, the flow history screen displaying one or more of the amount of grease supplied through the grease supply valve, the amount of grease remaining in the grease reservoir, and the volume of the grease reservoir.

11. The remote greasing system of claim 6, wherein a button of the graphical user interface starts grease flow through the grease supply valve, stops grease flow through the grease supply valve, provides a timed pulse of grease through the grease supply valve, executes a prespecified or customized series of openings and closings of the grease supply valve, or disallows the opening of the grease supply valve under prespecified operating conditions.

12. The remote greasing system of claim 1, wherein the grease supply skid and remote greasing skid are on one skid.

13. A method comprising:
   providing a grease supply skid, the grease supply skid including a grease reservoir and a grease pump;
   positioning the grease supply skid within a threshold distance of a wellhead or a frac manifold defining a hazardous zone;
   providing a remote greasing skid, the remote greasing skid including:
      a grease manifold; and
      a grease supply valve, the grease supply valve operatively coupled to the grease manifold, the grease supply valve having an output port;

positioning the remote greasing skid within the hazardous zone;

operatively coupling the grease manifold to the grease pump of the grease supply skid by a grease trunk line;

coupling the output port of the grease supply valve to a lubrication port of a valve of the wellhead or the frac manifold by a grease supply line;

providing a control skid, the control skid including an interface;

positioning the control skid outside of the hazardous zone;

operatively coupling the control skid to the remote greasing skid by a control line;

the control skid adapted to control the actuation of the grease supply valve;

providing grease to the remote greasing skid with the grease supply skid;

actuating the grease supply valve with the control skid; and providing grease to the valve of the wellhead or the frac manifold.

14. The method of claim 13, wherein the grease supply valve is actuated pneumatically, hydraulically, or electrically.

\* \* \* \* \*